United States Patent
Pityo

[11] 3,882,624
[45] May 13, 1975

[54] BAIT NET
[75] Inventor: William D. Pityo, St. Petersburg, Fla.
[73] Assignee: Reel Power Equipment, Inc., St. Petersburg, Fla.
[22] Filed: Oct. 29, 1973
[21] Appl. No.: 410,357

[52] U.S. Cl. ................................................ 43/12
[51] Int. Cl. ............................................ A01k 77/00
[58] Field of Search .................................. 43/11, 12

[56] References Cited
UNITED STATES PATENTS

| | | | |
|---|---|---|---|
| 167,189 | 8/1875 | Nason | 43/11 |
| 315,107 | 4/1885 | Bailey | 43/11 |
| 834,905 | 11/1906 | Haskell | 43/12 |
| 844,594 | 2/1907 | Haskell | 43/12 |
| 2,587,770 | 3/1952 | Schatz | 43/12 |
| 2,683,321 | 7/1954 | Faber | 43/12 |

Primary Examiner—Warner H. Camp
Attorney, Agent, or Firm—B. P. Fishburne, Jr.

[57] ABSTRACT

A bait net consists of a net body portion mounted on an expansible and contractable hoop of resilient material. The net structure can be coiled into very compact form and expanded to a relatively large diameter. A locking and guiding device for the hoop facilitates the coiling operation and allows ready locking of the hoop in the fully expanded condition.

2 Claims, 6 Drawing Figures

PATENTED MAY 13 1975

PATENTED MAY 13 1975 3,882,624

BAIT NET

BACKGROUND OF THE INVENTION

Bait nets are available on the market today but generally are rather awkward and cumbersome and therefore not too practical. Some examples of the known patented prior art are U.S. Pat. Nos. 1,832,178; 1,888,138; 2,194,621 and 2,814,899.

Ideally, a bait net should be easily adjustable between a wide open use position and a highly compact carrying or storage position while not in use. The compactness of the structure is also very important from a manufacturer's standpoint to facilitate the formation of a small lightweight package. Accordingly, the objective of the invention is to improve upon the prior art through the provision of an economical bait net which is quickly and easily adjustable through wide limits, lightweight and very durable.

More particularly, the invention is founded upon the use of a readily expansible and contractable frame or hoop and an associated simplified locking and guiding device for the hoop which facilitates the expansion and coiling of the hoop and the locking thereof in a fully expanded use position. In essence, the invention includes only three major parts and therefore simplicity is one of the chief attributes of the device, in comparison to the relatively awkward, complex and costly prior art. The bait net may be constructed in a wide range of sizes and various materials may be successfully employed.

Other features and advantages of the invention will become apparent during the course of the following detailed description.

BRIEF DESCRIPTION OF DRAWING FIGURES

DETAILED DESCRIPTION

Figure 1:
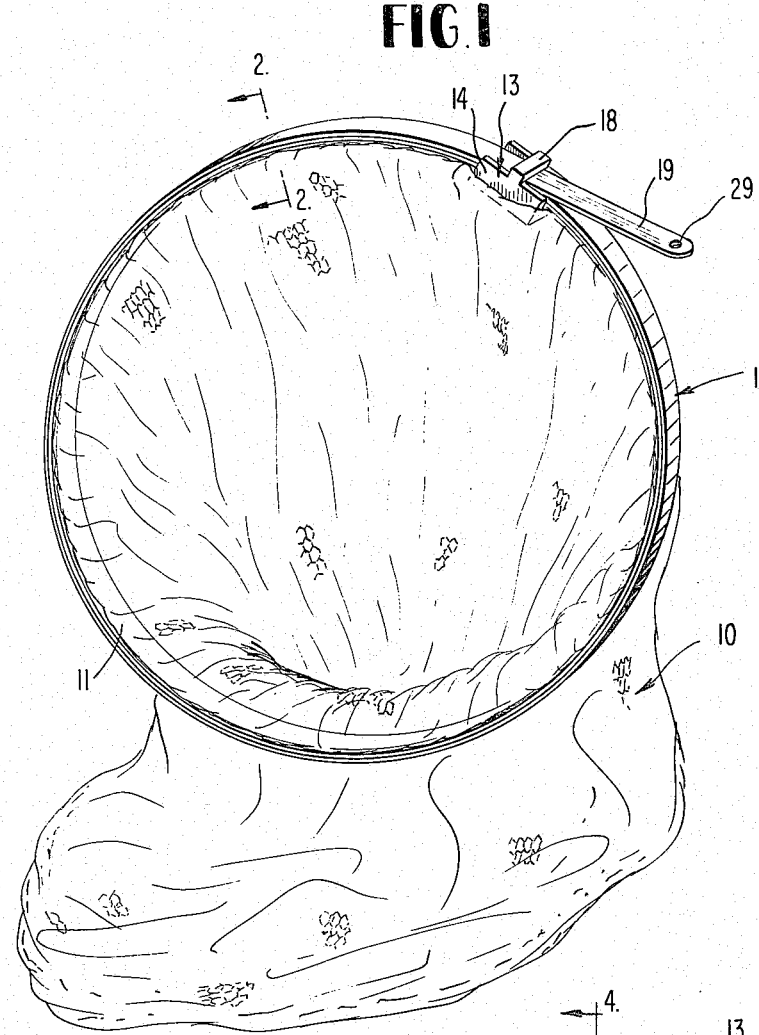
FIG. 1 is a perspective view of a bait net embodying the invention in a contracted or coiled condition for compact storage or packaging.
Figure 2:
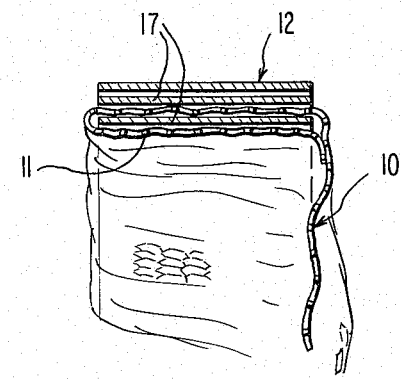
FIG. 2 is an enlarged fragmentary cross section taken on line 2—2 of FIG. 1.

Referring to the drawing in detail, wherein like numerals designate like parts, the bait net embodying the invention comprises a net body 10 of suitable conventional material having a readily expansible and contractable mouth bounded by a tubular hem 11. The net may be constructed from nylon mesh or other suitable natural or synthetic flexible material.

Figure 5:
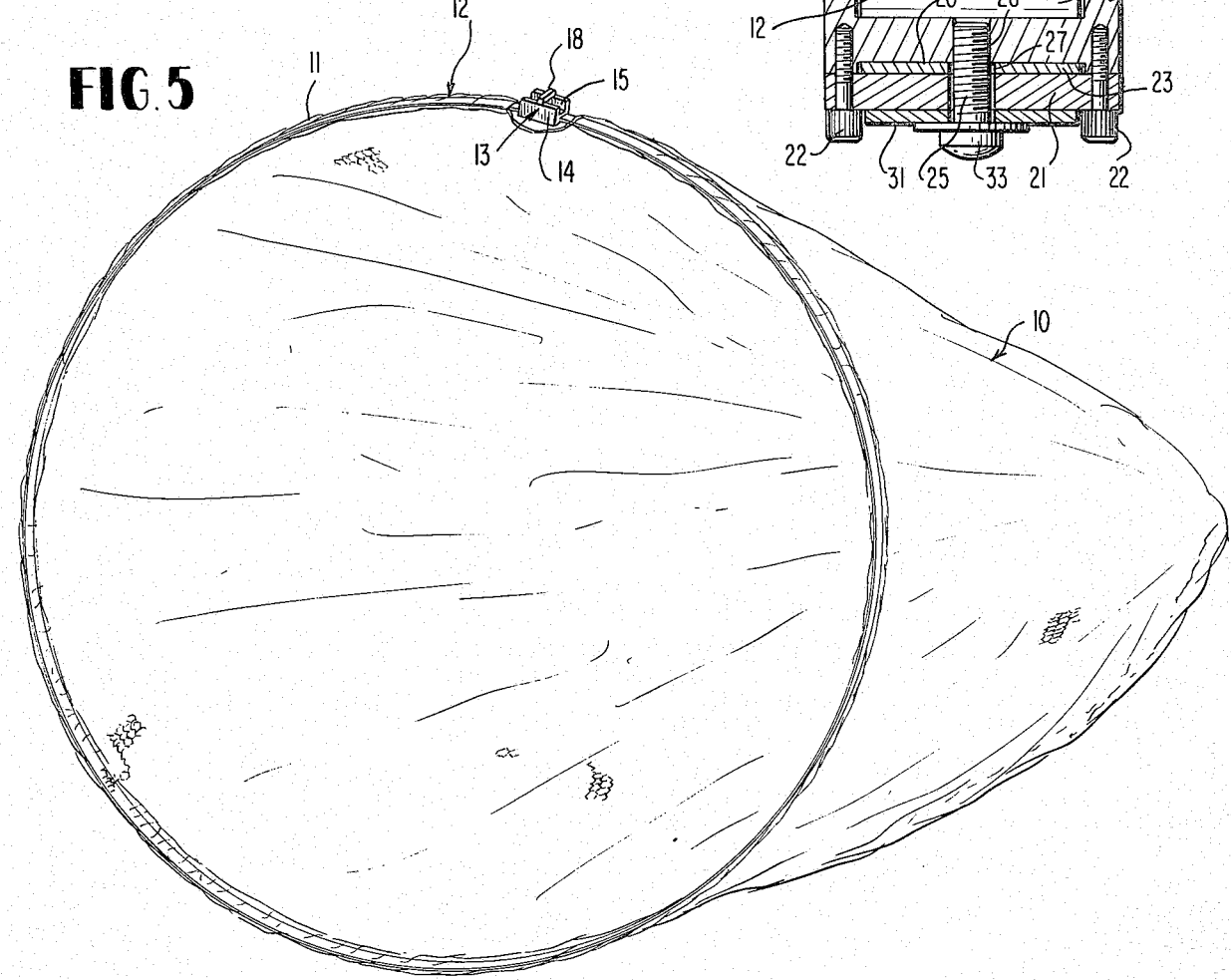
FIG. 5 is a perspective view of the net in the fully expanded use position.

The bait net additionally comprises a readily expandable and contractable resilient band or hoop 12 formed of resilient material, such as stainless steel, or a tough resilient plastic. The uncoiled length of the band or hoop 12 may vary depending upon the expanded diameter for the bait net which it is desired to achieve. For example, it is contemplated providing bait nets whose expanded use diameters at the mouth defined by the hoop 12 will range from 2 feet up to 6 feet or more. It will be understood that the resilient hoop 12, when fully opened or expanded as illustrated in FIG. 5, constitutes a relatively rigid frame for the wide open mouth of the net.

Figure 3:
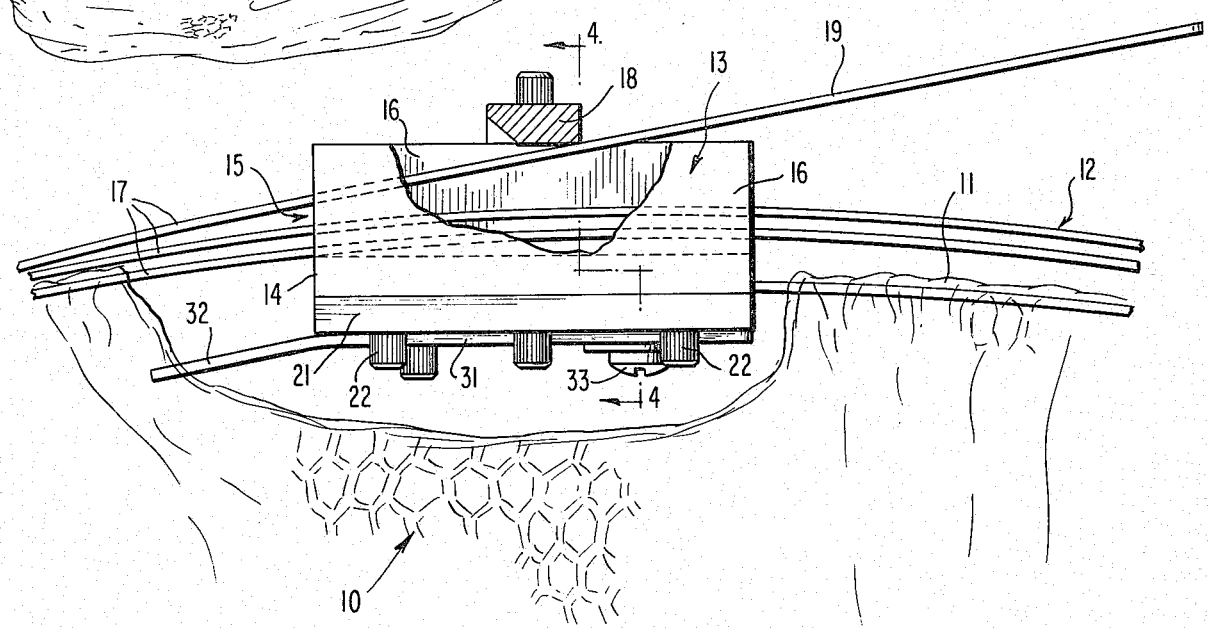
FIG. 3 is an enlarged fragmentary side elevation of the bait net shown in FIG. 1 with parts broken away and parts in section.
Figure 4:
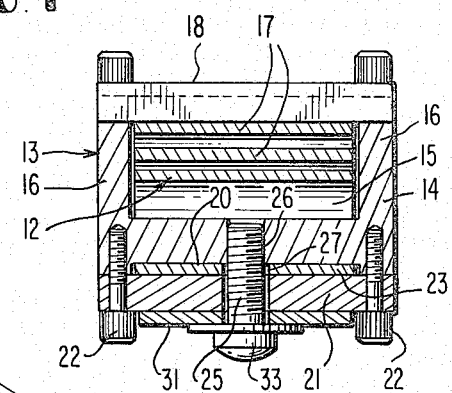
FIG. 4 is a fragmentary vertical section taken on line 4—4 of FIG. 3.

The third and last major component of the bait net comprises a locking and guiding device 13 which may be formed in whole or in part from metal or a suitable plastic. The device 13 comprises a channel body portion 14 forming a relatively deep guide passageway 15 between its two side walls 16 for one or more coils 17 of the resilient hoop 12. As shown in FIG. 4, the width of the guiding passageway 15 is such that it will receive the coils 17 in relatively close fitting relationship for proper guidance thereof as the band or frame is being coiled or uncoiled to close or expand the structure. The outer open side of the passageway 15 is obstructed by a guiding crossbar 18 which resists outward expansion of the highly resilient free end portion 19 of the coiled hoop 12, as shown in FIGS. 1 and 3. The crossbar 18 is suitably rigidly mounted on the outwardly projecting side walls 16 at the longitudinal center of the channel body portion 14. The depth of the guide passageway 15 will vary somewhat dependent upon the length of the element 12 required to produce a particular expanded diameter for the bait net.

The bottom of the channel body portion 14 has a relatively shallow recess 20 formed therein of sufficient depth only to accommodate one layer or thickness of the resilient hoop 12, as shown. This recess is covered on the interior side of the hoop by a cover plate 21 suitably rigidly secured to the body portion 14 as by screws 22. This construction forms a straight longitudinal through slot or passageway in the device 13, as best shown in FIG. 6, capable of receiving the two ends of the hoop 12 when the latter is fully expanded, or one end thereof when the hoop and net are coiled and contracted to the non-use position of FIG. 1.

Figure 6:
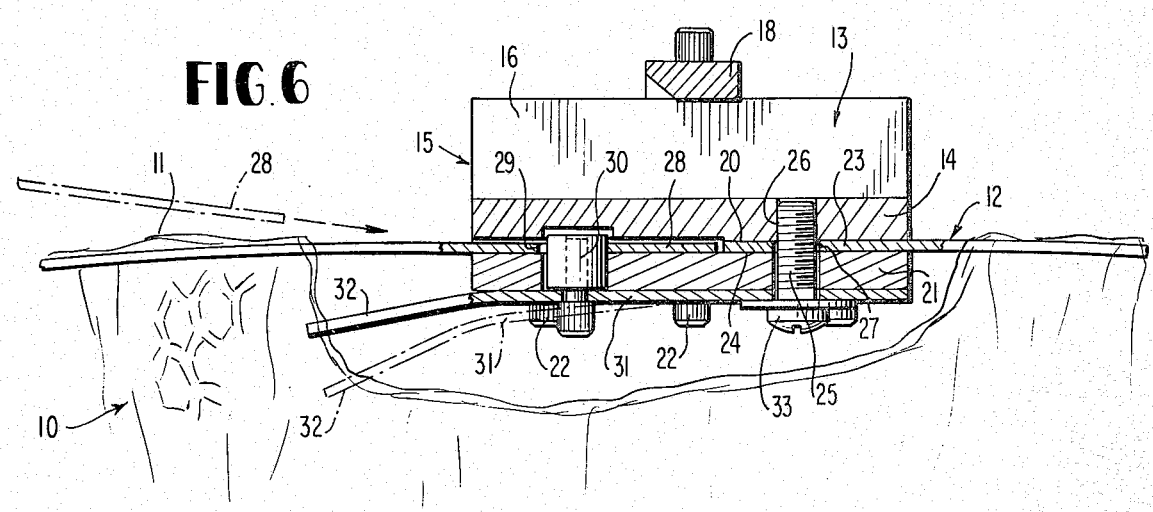
FIG. 6 is a cross sectional view similar to FIG. 3 showing the means for locking the net structure in the expanded use position.

More particularly, one end portion 23 of the element 12 is permanently secured within one end of the through passage 24, FIG. 6, by a screw 25 having threaded engagement within a screw-threaded opening 26 of the channel body portion 14 at the transverse center thereof, FIG. 4, and near one end thereof, FIG. 6. This screw passes through an aperture 27 formed in the end portion 23 of the band or hoop 12. This arrangement serves to securely lock the end portion 23 fixedly in the through passage 24 of device 13.

The opposite end portion 28 of the hoop 12 is adapted to be removably locked within the other end of the through passage 24 as shown in FIG. 6. To facilitate this, the end portion 28 is apertured at 29 to receive releasably a cylindrical locking pin 30 carried by a leaf spring 31 having an operating extension 32. The leaf spring 31 is secured to the interior of cover plate 21 by the head 33 of screw 25 or by other convenient means. The leaf spring 31 can be flexed inwardly manually toward the broken line position shown in FIG. 6 to release the locking pin 30 from the aperture 29 in end portion 28 so that this end portion can be quickly separated from the locking and guiding device 13, preparatory to coiling and contracting the hoop 12 to the non-use position shown in FIG. 1. Conversely, when the loop is uncoiled and fully expanded to the use position of FIG. 5, the free end portion 28 is easily introduced snugly into one end of the through passage 24 of the device 13 and is releasably locked therein firmly by the action of the pin 30 and aperture 29.

In connection with the operations of expanding and contracting the mouth of the bait net, the following should be understood. The tubular hem 11 of the net body 10 fits loosely and slidably on the relatively thin flat resilient band or hoop 12 and is readily adjustable on this hoop by hand in relation to the device 13 which is fixed to the end portion 23 of the hoop. When the hoop 12 is expanded, the tubular hem 11 is similarly expanded and extends around the entire diameter of the hoop as illustrated in FIG. 5, which open diameter may be six feet or more in practice. The end portion 28 of the hoop will then be locked to the device 13 releasably in the manner fully described above.

To contract and coil the hoop 12 so as to place the bait net in a compact state for packaging or storage, the leaf spring 31 is flexed to release the end portion 28 from the device 13, as described. This free end portion of the resilient element 12 is then inserted longitudinally into the guide passageway 15 and passed repeatedly around the periphery of the bait net mouth with successive coils 17 entering the passageway 15 until the diameter of the hoop and bait net mouth is reduced to about one foot in diameter or less. The final free end 19 of the coiled hoop will then reside under the bar 18 and will be held thereby against outward springing movement. If desired, for complete compactness, the free end 19 may be secured to the coiled body portion of the hoop with a suitable spring clip, not shown. During the coiling or uncoiling operations of the hoop 12, care should be taken to adjust the hem 11 of the net body along the hoop or frame 12, as required. Particularly during the coiling operation, the net is gathered in at the end 12 and pushed toward the device 13 as tightly as possible.

It may be seen that the device 13 constitutes a secure holding or locking unit for the opposite ends of the element 12, allowing one end thereof to be quickly separated as described. Additionally, the device is a guide for the coiling and uncoiling of the element 12 and avoids entangelement of the successive coils 17 which would be rather unwieldy in the absence of positive guidance. Finally, the device 13, through its crossbar 18, serves the third function of holding the coiled hoop 12 against accidental expansion prior to the time when this is desired. When desired, the free end 19 is simply withdrawn from under the crossbar 18 and retracted from the guide passage 15 gradually as the resilient hoop uncoils and expands to the open position of FIG. 5.

The invention thus provides with the minimum number of simple components a bait net structure which is easily coiled up to a very compact form for packaging and equally easily expanded to a use position wherein the net has a large diameter at the mouth. The structure is very economical and sturdy and durable. It is substantially foolproof in operation and the more complex and impractical structures of the prior art are avoided in the improved device.

While a particular form of locking and guiding mechanism or device has been shown and described, it should be understood that other mechanisms for these purposes could be employed within the scope of the invention.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A bait net comprising a net body having an expansible and contractable mouth and having a tubular hem portion adjacent said mouth, and expansible and contractable frame for the bait net consisting of a unitary elongated thin strip of uniform cross section and formed of resilient material, said tubular hem portion being adapted to receive said frame therethrough loosely and movably, a guiding and locking unit for said expansible and contractable frame including a rigid body having a relatively narrow slot formed therethrough from end-to-end, said slot conforming substantially to the cross sectional shape of said strip so that the opposite ends of the strip may enter the slot in generally close fitting relation therewith, said rigid body having a relatively deep channel passage formed therethrough from end-to-end outwardly of said slot in relation to said frame and tubular hem, said channel passage being deep enough to receive plural convolutions of said strip therein in radially superposed relation and said channel passage being of a width to prevent appreciable edgewise displacement of said convolutions, said slot and channel passage being parallel and extending generally circumferentially of the net mouth and said frame, a transverse retainer bar on said rigid body spanning the outer open side of said channel passage and serving to retain said plural convolutions therein while allowing them to slide lengthwise in the channel passage, the opposite ends of said strip being apertured, a longitudinal leaf spring element on the interior side of said rigid body remote from the channel passage, an anchoring screw for said leaf spring element engaged threadably in said rigid body and extending through the aperture near one end of said strip for locking said one end in said relatively narrow slot, and a locking pin element on the leaf spring element spaced from said screw and received by an opening in the interior side of the rigid body and adapted to enter the aperture near the other end of said strip when the other end is engaged in said slot to releasably lock the other end in said slot when said bait net is in a fully expanded condition.

2. The structure of claim 1, wherein said strip constituting said frame is formed of springy metal.

* * * * *